United States Patent
Mory et al.

(10) Patent No.: US 7,916,168 B2
(45) Date of Patent: Mar. 29, 2011

(54) DISPLAY OF AN ARRANGEMENT OF A PANORAMIC VIDEO BY APPLYING NAVIGATION COMMANDS TO SAID PANORAMIC VIDEO

(75) Inventors: Benoit Mory, Paris (FR); Nicolas Santini, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1116 days.

(21) Appl. No.: 10/218,204

(22) Filed: Aug. 13, 2002

(65) Prior Publication Data
US 2003/0210327 A1    Nov. 13, 2003

(30) Foreign Application Priority Data
Aug. 14, 2001 (FR) ...................................... 01 10807

(51) Int. Cl.
*H04N 7/00* (2006.01)
(52) U.S. Cl. ........................................................ 348/36
(58) Field of Classification Search .................... 348/36, 348/39, 42, 47, 48, 49, 43, 333.05, 231, 334, 348/552, 438, 148, 105, 207.99, 723, 720, 348/333, 207; 725/87, 61, 46
See application file for complete search history.

(56) References Cited

U.S. PATENT DOCUMENTS

| | | | | |
|---|---|---|---|---|
| 5,510,811 A | * | 4/1996 | Tobey et al. | 345/157 |
| 6,032,098 A | * | 2/2000 | Takahashi et al. | 701/210 |
| 6,337,683 B1 | * | 1/2002 | Gilbert et al. | 345/418 |
| 6,356,297 B1 | * | 3/2002 | Cheng et al. | 348/36 |
| 6,466,198 B1 | * | 10/2002 | Feinstein | 345/158 |
| 6,559,846 B1 | * | 5/2003 | Uyttendaele et al. | 345/473 |
| 6,690,268 B2 | * | 2/2004 | Schofield et al. | 340/438 |
| 7,170,518 B1 | * | 1/2007 | Millington et al. | 345/428 |
| 2002/0021353 A1 | * | 2/2002 | DeNies | 348/36 |
| 2002/0089587 A1 | * | 7/2002 | White et al. | 348/105 |
| 2003/0197785 A1 | * | 10/2003 | White et al. | 348/207.99 |
| 2004/0148102 A1 | * | 7/2004 | McCarthy et al. | 701/213 |

FOREIGN PATENT DOCUMENTS

EP    0930584 A2    7/1999

\* cited by examiner

*Primary Examiner* — Behrooz Senfi

(57) ABSTRACT

An arrangement of a panoramic video is obtained by applying navigation commands to said panoramic video. In accordance with the invention, the navigation commands are formed either by navigation commands given at will by the user, or by predefined navigation commands associated with said panoramic video. The choice of the type of navigation command used at a given instant is controlled either automatically or by the user. The invention thus permits to avoid a user losing the thread of the action when navigates freely through a panoramic video.

21 Claims, 1 Drawing Sheet

DISPLAY OF AN ARRANGEMENT OF A PANORAMIC VIDEO BY APPLYING NAVIGATION COMMANDS TO SAID PANORAMIC VIDEO

FIELD OF THE INVENTION

The invention relates to display equipment of a video arrangement by applying navigation commands to a panoramic video, comprising a control device intended to be manipulated by a user to define navigation commands in accordance with a display.

The invention also relates to a transmission system comprising such display equipment.

The invention also relates to a display method of a video arrangement by the application of navigation commands to a panoramic video, as well as a program comprising instructions for implementing such a method when it is executed by a processor.

With this type of equipment the user exactly controls that which he wants to see in a 360° landscape. Such equipment has a number of applications. It permits, for example, to display films or programs while having the impression of taking part in the action. It also permits to propose to a user interactive virtual visits of varied sites, for example, interactive virtual visits to houses, museums . . . .

BACKGROUND OF THE INVENTION

European patent application EP0930584A2 indicates that it is possible for a user to navigate in panoramic images by modifying the position and orientation of a view point that defines a certain field of vision.

But, when the user defines his navigation himself, he risks of being lost in the program. This is particularly annoying when the user displays programs such as films or re-runs of events because he then risks to lose the thread of the action.

It is an object of the invention to remedy this drawback.

SUMMARY OF THE INVENTION

This object is achieved with display equipment, a display method, a transmission program and system as claimed in the claims 1, 5, 7 and 8, respectively, of the present application.

In accordance with the invention a selection device permits to apply to the panoramic video either a navigation defined by the user himself or a predefined navigation.

In a first embodiment the selection is controlled by the user. By way of example the user who freely navigates in a panoramic video may at any moment choose to apply a predefined navigation to refocus on the action. He can then resume manual control when he so wishes.

In a second embodiment the selection is controlled automatically. By way of example a predefined navigation is applied at certain predefined instants and between these predefined instants the navigation is freely defined by the user.

It will be noted that said European patent application EP0930584A2 also indicates that another way of creating an animation is to navigate in a sequence of positions and orientations which are predefined from the point of view. But this navigation mode eliminates any possibility of interaction for the user.

The invention proposes a combined use of navigation commands defined freely by the user and predefined navigation commands. The invention also permits to profit by the advantages of each of the two modes of navigation cited in the prior art.

The predefined navigation commands are formed each by one or more files associated to said panoramic video and containing each a sequence of navigation commands that corresponds to a particular arrangement of the panoramic video. Such a file is, for example, a description file of said panoramic video in which camera motion parameters are defined, which camera motion parameters form said predefined navigation commands. Such a file is in conformity, for example, with MPEG-7 standard.

BRIEF DESCRIPTION OF THE DRAWINGS

These and other aspects of the invention are apparent from and will be elucidated, by way of non-limitative example, with reference to the embodiment described hereinafter.

In the drawings.

DESCRIPTION OF PREFERRED EMBODIMENTS

Figure 1:
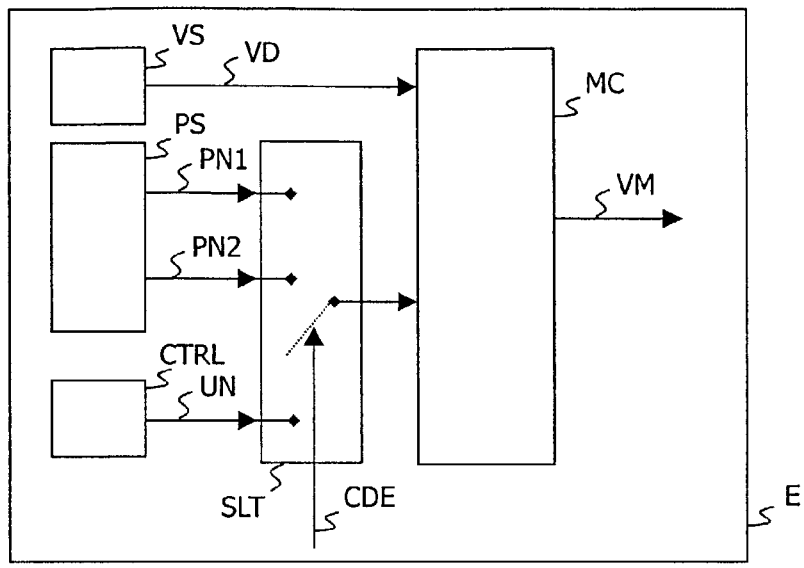
FIG. 1 is a general functional diagram of an example of display equipment according to the invention.

In FIG. 1 is represented a general functional diagram of an example of equipment according to the invention of a display of an arrangement of a panoramic video via the application of navigation commands to said panoramic video.

The display equipment E comprises a panoramic video source VS. This source VS supplies video data VD which are transmitted to a mounting device MC intended to form an assembly VM of said panoramic video.

The equipment E also comprises a control device CTRL intended to be manipulated by a user for defining navigation commands UN in accordance with the display. This control device is formed, for example, via a mouse.

The equipment E also comprises a predefined navigation command source PS. In FIG. 1 this source PS delivers two sequences of navigation commands referenced PN and 1 and PN2.

The navigation commands UN, PN1 and PN2 are supplied to a selection device SLT. The selection device receives a command CDE for selecting either the navigation commands UN defined by the user, or anyone of sequences of predefined navigation commands PN1 and PN2 produced by the navigation command source PS. The selection device SLT then supplies the selected navigation commands to the assembly MC.

The command CDE is formed either by a user command or by an automatic command. When the command CDE is a user command, the user can choose at any moment the navigation commands to be applied to the assembly MC. More particularly, he has the possibility of refocusing on the action by using predefined navigation commands. When the command CDE is an automatic command, predefined navigation commands PN1 or PN2 are applied, for example, at certain predefined instants among which they are the navigation commands UN defined by the user that are applied. This embodiment permits to supply to the user guides for navigation through program so that he can freely navigate between said view points imposed for modifying his field of vision. The imposed view points advantageously correspond to the important events of the program. Thus the user no longer runs the risk of losing the thread of the action.

Figure 2:
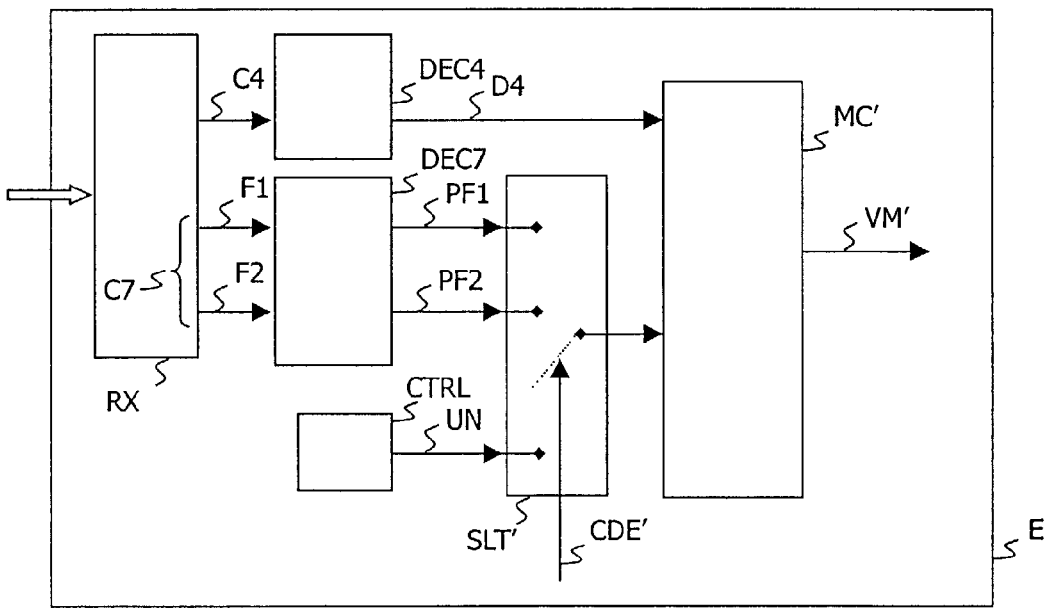
FIG. 2 is a functional diagram of a preferred embodiment of display equipment according to the invention.

In FIG. 2 is represented a functional diagram of a preferred embodiment of equipment E' according to the invention. According to FIG. 2 the equipment E' comprises a receiver RX for receiving data C4 coded in the MPEG-4 format, which represent said panoramic video (MPEG-4 is a coding standard for audio/video objects which is defined by the ISO). The equipment E' also comprises an MPEG-4 decoder referred to as DEC4 for decoding the coded data C4. The decoded data D4 delivered on the output of the decoder DEC4 are supplied to a mounting device MC'.

The receiver RX advantageously also receives data C7 coded in the MPEG-7 format, associated to the data C4 and which contain predefined navigation commands (MPEG-7 is a standard of describing the contents of the video defined by the ISO, which defines a certain number of video contents descriptors, notably a camera motion descriptor; according to the invention the camera motion descriptors contained in an MPEG-7 file are advantageously used as predefined navigation commands). The equipment E' then comprises a decoder DEC7 for decoding the data C7 and extract the predefined navigation commands. In FIG. 2 the data C7 are formed by two MPEG-7 files referred to as F1 and F2. These two files F1 and F2 are supplied to the input of the decoder DEC7. The decoder DEC7 decodes the files F1 and F2 and extracts therefrom two predefined navigation command sequences PF1 and PF2. The two predefined navigation command sequences are supplied to a selection device SLT'. The selection device SLT' receives a command CDE' for selecting either the navigation commands UN defined by the user, or anyone of the predefined navigation command sequences PF1 and PF2 supplied by the decoder DEC7. The selection device SLT' then supplies the selected navigation commands to an assembly device MC'.

Figure 3:
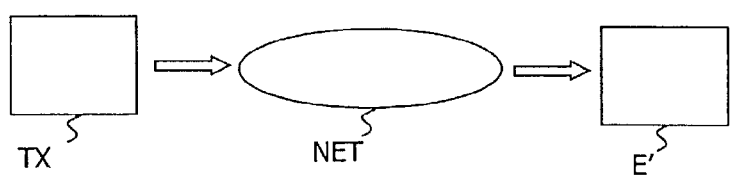
FIG. 3 is a block diagram of an example of a transmission system according to the invention.

In FIG. 3 is represented a transmission system according to the invention which comprises:
- a transmitter TX for transmitting data representing a panoramic video (for example, data coded in the MPEG-4 format), and commands of predefined navigations associated to said panoramic video (for example, one or more files of the MPEG-7 format which contain such predefined navigation commands);
- a transport network (NET);
- display equipment of a panoramic video assembly (for example, equipment of the type E' described with regard to FIG. 2).

In another embodiment of the invention (not shown), the data representing the panoramic video and the associated predefined navigation commands are stored on a medium (for example, on a disc) intended to be read by the display equipment.

In practice the invention is utilized by using software means. For this purpose, equipment according to the invention comprises one or more processors and one or more program storage memories, said programs containing instructions for the use of the functions that have just been described when they are executed by said processors.

The invention claimed is:

1. A display controller for controlling display of panoramic video that includes a plurality of viewpoints that define a field of vision of the panoramic video, the controller comprising:
   a first command source that is configured to provide a first type of navigation commands;
   a second command source for providing a plurality of second types of navigation commands;
   a selection device that is configured to select the first or second command source; and
   at least one other source of the second type of navigation commands,
   wherein the first type of navigation commands are generated by a user to control the display, the second type of navigation commands are predefined to control the display, and to control the viewpoint independent of the control of the viewpoint by the user and wherein the selection device is configured to select from among the source and the at least one other source when the selection device places the display controller to be controlled by the second type of navigation commands.

2. The display controller of claim 1, wherein the second command source includes a file that is associated with the panoramic video and includes a sequence of navigation commands that corresponds to a particular assembly of the panoramic video.

3. The display controller of claim 2, wherein the file includes parameters of camera motions that are used to form the second type of navigation commands.

4. The display controller of claim 1, including a receiver for receiving codes representing the panoramic video and the second type of navigation commands.

5. A method of displaying a video montage via application of a plurality of types of navigation commands that control a display of a panoramic video, the method comprising acts of:
   receiving video data that includes a plurality of viewpoints that define a field of vision of the panoramic video;
   displaying panoramic video on a mounting device used for assembling the panoramic video;
   selecting either a first or second type of navigation commands to control the displaying,
   wherein the first type of navigation commands are provided by a user to control the display of the panoramic video on a display device, and a course of motion of the viewpoint, the second type of navigation commands are supplied by a source of predefined navigation commands to control the display of the panoramic video on the display device and to change the viewpoint independent of the control of the viewpoint by the user and wherein the selecting act further comprises an act of automatically selecting the second type of the navigation commands at predefined instants and between these predefined instants automatically selecting the first type of the navigation commands.

6. The method of claim 5, wherein the source includes a file that includes camera motion parameters that are used to form the second type of navigation commands.

7. A program stored on a computer-readable medium containing instructions for implementing the method of claim 5 while it is executed by a processor.

8. A transmission system comprising:
   a transmitter that is configured to transmit a panoramic video and predefined navigation commands associated to the panoramic video,
   a transmission network that is configured to transmit the panoramic video and the associated predefined navigation commands, and
   display controller as claimed in claim 4.

9. A program stored on a computer-readable medium containing instructions for implementing the method of claim 6 while it is executed by a processor.

10. The display controller of claim 1, including a display device.

11. The display controller of claim 1, wherein the selection device is configured to be controlled by the user.

12. The display controller of claim 1, wherein the selection device is configured to place the display controller to be controlled by the second type of the navigation commands independent of the user, and to place the display controller to be controlled by the first type of the navigation commands based on an input from the user.

13. The display controller of claim 12, wherein the selection device is configured to place the display controller to be controlled by the second type of the navigation commands based on predefined events associated with a rendering of the panoramic video.

14. The display controller of claim 1, wherein the viewpoint defines a location relative to the panoramic video.

15. The display controller of claim 1, wherein the viewpoint defines an orientation relative to the panoramic video.

16. The display controller of claim 1, wherein each of the source and at least one other source provide the second type of navigation commands corresponding to a particular predefined plurality of view points for viewing of the panoramic video.

17. The display controller of claim 16, wherein the panoramic video corresponds to a program, and the display controller is configured to impose one or more of the view points corresponding to important events of the program.

18. The display controller of claim 1, wherein the second type of navigation commands correspond to a predefined plurality of view points for viewing of the panoramic video.

19. The display controller of claim 18, wherein the panoramic video includes images from a place of interest, and the second type of navigation commands correspond to a visual tour of the place of interest.

20. The display controller of claim 1, wherein the selection device is configured to automatically select the second type of the navigation commands at predefined instants and between these predefined instants automatically select the first type of the navigation commands.

21. A display controller for controlling display of panoramic video that includes a plurality of viewpoints that define a field of vision of the panoramic video, the controller comprising:
    a first command source that is configured to provide a first type of navigation commands;
    a second command source for providing a plurality of second types of navigation commands; and
    a selection device that is configured to select the first or second command source,
    wherein the first type of navigation commands are generated by a user to control the display, the second type of navigation commands are predefined to control the display, and to control the viewpoint independent of the control of the viewpoint by the user and the selection device is configured to automatically select the second type of the navigation commands at predefined instants and between these predefined instants automatically select the first type of the navigation commands.

* * * * *